United States Patent [19]

Bolle

[11] Patent Number: 4,963,813
[45] Date of Patent: Oct. 16, 1990

[54] CONTROL PROVIDING PROGRESSIVE CHARGING IN A DUAL VOLTAGE CHARGING SYSTEM

[75] Inventor: Donald Bolle, Glenview, Ill.

[73] Assignee: C. E. Niehoff & Co., Evanston, Ill.

[21] Appl. No.: 279,473

[22] Filed: Dec. 2, 1988

[51] Int. Cl.⁵ .............................................. H02J 7/14
[52] U.S. Cl. ........................................ 320/17; 320/6; 322/90
[58] Field of Search ................... 320/6, 15, 17, 18, 31, 320/32, 61; 322/28, 90, 94

[56] References Cited

U.S. PATENT DOCUMENTS

| | | | |
|---|---|---|---|
| 3,623,139 | 11/1971 | Dickerson | 320/22 |
| 3,624,480 | 11/1971 | Campbell | 320/15 |
| 3,793,544 | 2/1974 | Baumgartner et al. | 320/17 |
| 3,809,995 | 5/1974 | Hardin | 320/17 X |
| 3,863,127 | 1/1975 | Raver | 320/15 |
| 4,041,363 | 8/1977 | Scheidler | 320/15 |
| 4,045,718 | 8/1977 | Gray | 322/90 X |
| 4,047,088 | 9/1977 | Himmler | 320/17 X |
| 4,179,647 | 12/1979 | Cummins et al. | 320/6 |
| 4,239,978 | 12/1980 | Kofink | 322/90 |
| 4,262,242 | 4/1981 | Glennon | 322/28 |
| 4,467,265 | 8/1984 | Hierholzer, Jr. | 320/17 |
| 4,686,442 | 8/1987 | Radomski | 322/90 X |
| 4,788,486 | 11/1988 | Mashino et al. | 322/90 X |
| 4,816,736 | 3/1989 | Dougherty et al. | 320/6 X |

Primary Examiner—Steven L. Stephan
Assistant Examiner—Kristine Peckman
Attorney, Agent, or Firm—Willian Brinks Olds Hofer Gilson & Lione

[57] ABSTRACT

A control for an electrical charging system for selectively connecting a single alternator with two stator coil sets producing charging current at each of six outputs to the output of a first battery and the output of a second battery serially connected to the first battery output. The control comprises a plurality of switchable full wave bridge rectifiers for connecting each of the alternator outputs to one of the first battery output and the second battery output so that the one battery is charged by the alternators. The switchable rectifiers are alternatively switchably connectable to the other battery output so that the other battery is charged by the alternators. The control also includes a switching circuit for switching first one, and then the next of each of the switchable circuits as the voltage across the other battery is increasingly less than the voltage across the one battery so that the rate of charging of the other battery is determined by the amount the voltage across the other battery is less than the voltage across the one battery.

12 Claims, 2 Drawing Sheets

CONTROL PROVIDING PROGRESSIVE CHARGING IN A DUAL VOLTAGE CHARGING SYSTEM

BACKGROUND OF THE INVENTION

This invention relates to a control for a dual voltage supply electrical charging system and, more particularly, to such dual voltage supplies used in motor vehicle electrical systems for supplying dual voltage loads such as 12 and 24 volt loads.

Various arrangements have been provided for connecting an engine driven alternator or generator to dual voltage supplies comprising two serially connected 12 volt batteries. Examples of dual voltage charging systems which connect the output of alternators to the 12 volt and 24 volt supplies via full wave rectifiers include Himmler U.S. Pat. No. 4,047,088 issued Sept. 6, 1977, and Campbell et al. U.S. Pat. No. 3,624,480 issued Nov. 30, 1971.

SUMMARY OF THE INVENTION

A control is provided for an electrical charging system for selectively connecting alternator means for producing charging current at each of at least two outputs to a first bus maintained at a first voltage and a second bus maintained at a second voltage. In one embodiment, the first bus is an output of a first battery and the second bus is an output of a second battery serially connected to the first battery output. The control comprises a plurality of switchable means for connecting each of the alternator means outputs to one of the first battery output and the second battery output so that the one battery is charged by the alternator means. The switchable means is alternatively switchably connectable to the other battery output so that the other battery is charged by the alternator means. The control also includes switching means for switching first one, and then the next of each of the switchable means as the voltage across the other battery compared to the voltage across the one battery is reduced so that the rate of charging of the other battery is determined by the amount of the reduction in the voltage across the other battery compared to the voltage across the one battery.

In one embodiment, the alternator means includes three outputs, and the one battery is the second battery. Further, the plurality of switchable means comprises a first plurality of rectifiers, each of which is connected to a respective one of the alternator means outputs and to the second battery output, and a second plurality of rectifiers, each of which is connected to a respective one of the alternator means outputs, and which is alternatively switchably connectable to the first battery output.

More particularly, each of the disclosed second plurality of rectifiers includes a controllable unidirectional current carrying device connected to a respective one of each of the alternator means outputs and to the first battery output.

In this embodiment, the switching means comprises means connected to each of the first battery output and the second battery output for comparing the voltage across the first battery and the voltage across the second battery, and means connected to and responsive to the comparing means for turning on one, then the next, and then the next of each of the controllable current carrying devices as the voltage across the second battery compared to the voltage across the first battery decreases, so that the alternator means outputs are sequentially connected to the second battery output to charge the second battery.

The disclosed comparing means produces a voltage signal, the magnitude of which is proportional to the difference between the actual ratio and a desired ratio of the voltage across the second battery and the voltage across the first battery. The disclosed means responsive to the comparing means comprises means serially connected one to another for incrementally reducing the voltage signal, and means connected between the serially connected means and connected to a different one of each of the controllable current carrying devices and responsive to a certain minimum voltage for turning on its respective current carry device.

One of the principal objects of the invention is to provide a control for an electrical charging system which charges the 12 volt and 24 volt supplies of a dual 12 volt/24 volt system, the control varying charging of the 12 volt supply depending on the rate of charging necessary in order to bring the 12 volt battery up to an appropriate charge level.

In dual voltage systems, the charging current is typically applied to the 24 volt supply. Further, charging of the 24 volt supply does, to a limited extent, help keep both of the serially connected 12 volt batteries at a sufficient voltage level. Frequently, however, loads on the 12 volt supply can severely drain the 12 volt supply battery, and prior controls for charging systems have failed to provide adequate charging of the 12 volt system. Accordingly, another of the principal objects of the invention is to provide a control which progressively increases the rate of charging of the 12-volt supply depending on the extent to which the actual ratio is less than the desired ratio of the voltage across the 12-volt supply battery compared to the voltage across the 12-volt supply battery connected to the 24-volt bus.

Another of the principal objects of the invention is to provide a control for a dual voltage electrical system, which control can effectively provide the dual voltages even when the serially connected batteries fail.

Other objects and advantages of embodiments of the invention will become apparent upon reviewing the following drawings, the detailed description and the appended claims.

Figure 1:
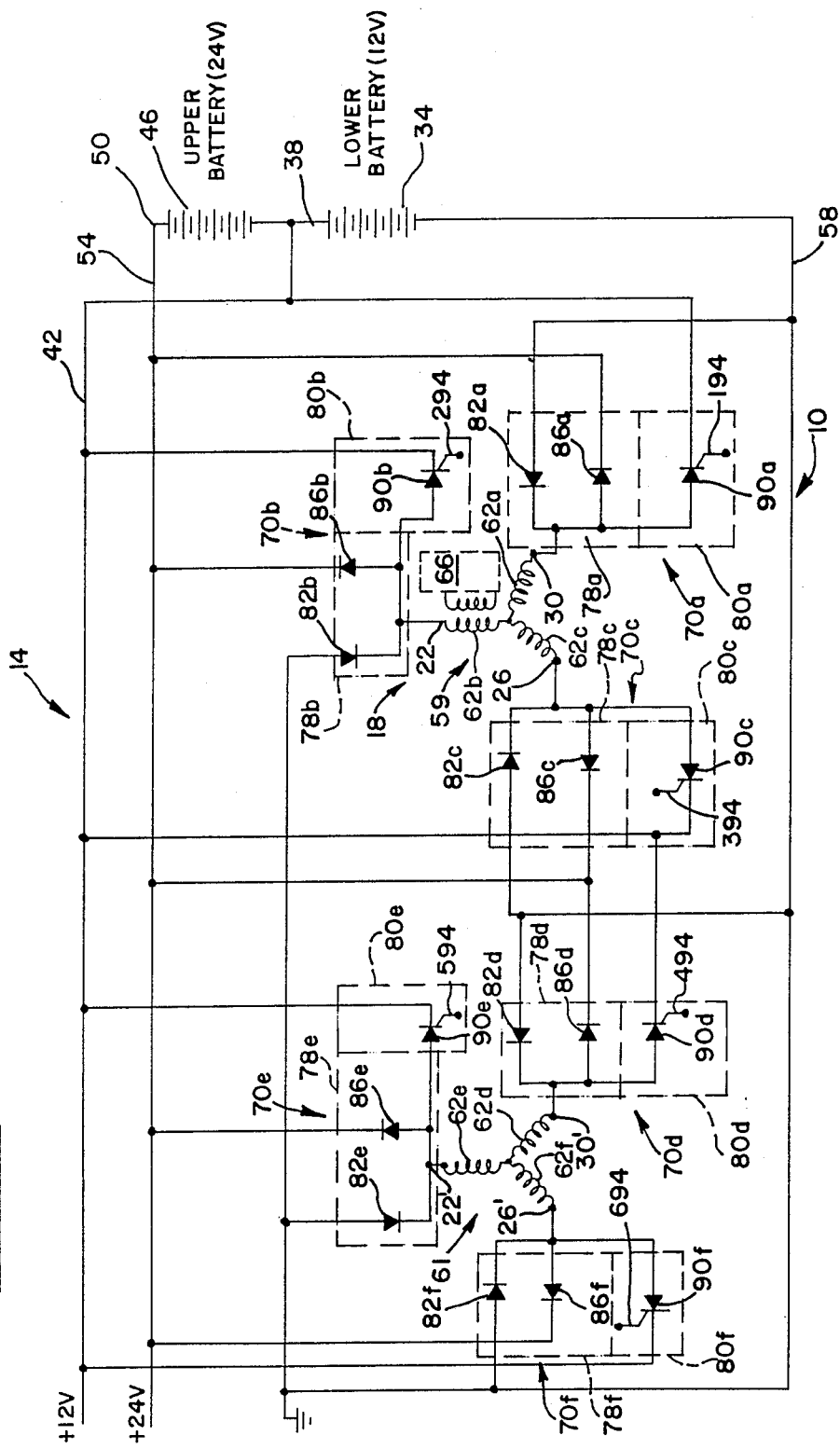
FIG. 1 is a schematic illustration of an electrical charging system which embodies various features of the invention.

Before explaining at least one embodiment of the invention in detail, it is to be understood that the invention is not limited in its application to the details of construction and the arrangement of the components set forth in the following description or illustrated in the drawings. The invention is capable of being practiced or carried out in various ways. Also, it is to be understood that the phraseology employed herein is for the purposes of description and should not be regarded as limiting.

DESCRIPTION OF THE PREFERRED EMBODIMENT

Figure 2:
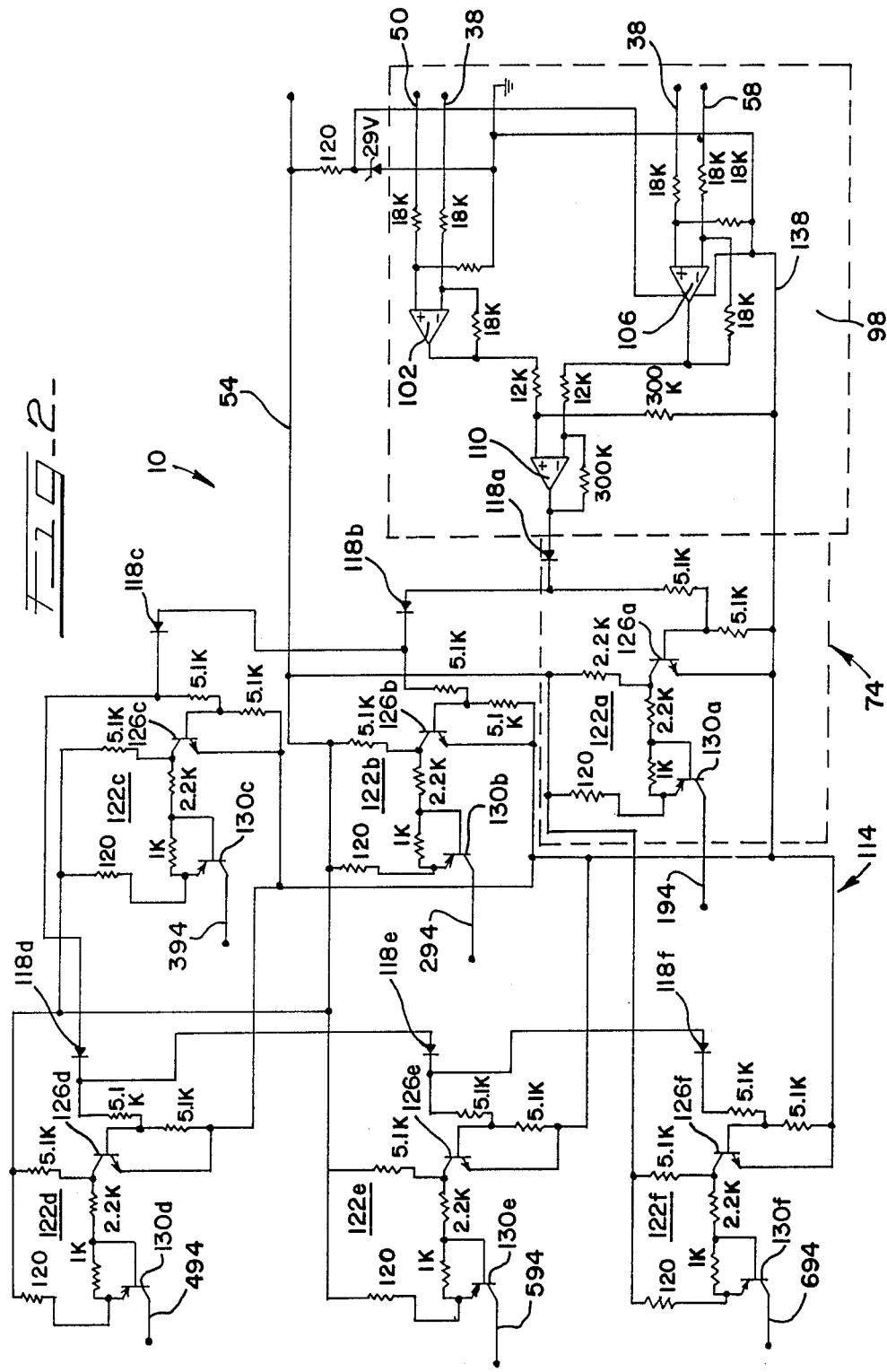
FIG. 2 is an illustration of a portion of the control for the electrical charging system illustrated in FIG. 1.

FIG. 1 and FIG. 2 illustrate a control 10 for electrical charging system 14. The control 10 provides for selectively connecting alternator means 18 for producing charging current at each of at least three outputs 22, 26 and 30 to a first battery 34 having a output 38 and a second battery 46 having an output 50. The second battery 46 is serially connected to the first battery output 38. The first battery 34 is preferably a 12-volt battery, and its output 38 is connected to a 12 volt bus 42 which supplies current to a 12-volt load (not shown).

The second battery 46 is also a 12-volt battery, and since it is connected in series to the first 12-volt battery output 38, the second battery output 50 is at approximately 24-volts. The second battery output 50 is connected to 24-volt bus 54 which in turn is connected to 24-volt load (not shown).

The alternator means 18 comprises a first stator coil set 59, and a second stator coil set 61. The construction of each of the stator coil sets is the same, so the construction of only the first stator coil set is explained in detail. Like numbers are used for similar components throughout the drawings.

The stator coil set 59 includes three stator coils 62a-62c each of which is connected at one end to each of the other stator coils 62a-62c. The opposite ends of the stator coils 62a-62c constitute the three outputs 22, 26 and 30 of the first stator coil set 59. Likewise, the second stator coil set 61 also includes three stator coils 62d-62f and three outputs 22', 26' and 30'.

The stator coil sets 59 and 61 also share a field coil and a voltage regulator 66 of a conventional design. The voltage regulator controls the amount of current which passes through the coil in order to ensure that sufficient charging voltage and current are always provided for the 24-volt bus. In various embodiments a single stator coil set, or a single alternator with multiple sets of stator coils, can be used.

The control 10 comprises a plurality of switchable means 70a-70f for connecting each of the alternator means outputs or taps 22, 26, 30, 22', 26' and 30' to the second battery output 50 so that the second battery 46 and the first battery 34 connected thereto are charged by the alternator means 18. More particularly, the switchable means 70a-70f are alternatively switchably connectable to the first battery output 38 so that the first battery 34 can be selectively charged by the alternator means 18.

The control also includes switching means 74 (see FIG. 2) for switching first one, then the next, and then the next of each of the switchable means 70a-70f as the voltage across the first battery 34 is increasingly less than the voltage across the second battery 46 so that the rate of charging of the first battery 34 is determined by the amount the voltage across the first battery 34 is less than the voltage across the second battery 46.

More particularly, the plurality of switchable means 70a-70f comprises a first plurality of six full wave bridge rectifiers 78a-78f, each of which is connected to a different one of the taps 22, 26, 30, 22', 26' and 30'. Each of the full wave bridge rectifiers 78a-78f comprises a first diode 82a-82f connected at its cathode to a respective one of the alternator means outputs or taps 22, 26, 30, 22', 26', 30' and connected at its anode to ground. Each of the full wave bridge rectifiers 78a-78f further includes a second diode 86a-86f having its anode connected to its respective alternator output and its cathode connected to the second battery bus 54.

The plurality of switchable means 70a-70f, also includes a second plurality of full wave bridge rectifiers 80a-80f so connected to the first battery output 38. Each of the full wave bridge rectifiers 80a-80f, in this embodiment also includes the first diode 82a-80f connected at its cathode to each of the taps and connected at its anode to the ground. In other embodiments, separate diodes can be used.

Each of the second plurality of full wave bridge rectifiers 80a-80f further includes a controllable unidirectional current carrying device in the form of thyristor or SCR 90a-90f connected to a different one of each of the taps 22, 26, 30, 22', 26' and 30' and to the first battery output 38. More particularly, each of the SCR's 90a-90f has its anode connected to its respective alternator means output and its cathode connected to the first battery output 38. Each of the SCR gates is connected to the switching means 74, as hereinafter explained. The gates are labeled 194, 294, 394, 494, 594 and 694, respectively, for each of the six second plurality of full wave bridge rectifiers 80a-80f.

Referring now to FIG. 2, the switching means 74 comprises comparing means 98 connected to the first battery output 38 and the second battery output 50 and to ground for comparing the voltage across the first battery 34 and the voltage across the second battery 46, and responsive means 114 connected to and responsive to the comparing means 98 for turning on one, then the next, and the next of each of the SCR's 90a-90f as the difference between the voltage across the second battery 46 and the voltage across the first battery 34 increases so that the taps 22, 26, 30, 22', 26' and 30' are sequentially connected to the first battery output 38 to charge the first battery 34.

More particularly, the comparing means 98 comprises a first buffer 102 connected to the terminals of the second battery 46 and a second buffer 106 connected to the terminals of the first battery 34. The outputs of the first buffer 102 and the second buffer 106, which are the voltages across the second battery 46 and the first battery 34, respectively, are inputted into an amplifier 110. The amplifier 110 produces a voltage signal proportional to the difference between the voltages across the first and second batteries.

The responsive means 114 comprises means in the form of diodes 118a-118f serially connected one to another for incrementally reducing the voltage signal. The responsive means 114 also includes trigger means 122a-122f connected to a different one of each of the six SCRs 90a-90f and connected to the output of each of the serially connected diodes 118. Each trigger means 122a-122f is responsive to a minimum voltage level for turning on its respective SCR 90a-90f, thereby directing the alternator charging current at its respective output to the first battery 34 instead of the second battery 46.

More particularly, each trigger means 122a-122f comprises a switching npn transistor 126a-126f having its base connected through a resistor to its respective diode 118a-118f, its collector connected through a resistor to voltage bus 54, through resistor to the base of a switching pnp transistor 130a-130f, and through another resistor to the emitter of the transistor 130a-130f. The emitter of the transistor 126a-126f is connected to ground. The collector of the transistor 130a-130f is connected to the respective gate 194 through 694 of its respective SCR 90a-90f.

The control 10 thus operates as follows. The combination of the first plurality of full wave bridges rectifiers 78a-78f and the voltage regulators 66 holds the 24 volt supply bus 54 at the appropriate voltage level. The comparing means 98 compares the voltage across each of the first and second batteries 34 and 46, respectively, and determines if the voltage of the 12 volt bus has dropped below the voltage across the terminals of the second battery 46. If it has, any where from one to six of the taps 22, 26 30, 22', 26' and 30' will be switched over to charging the 12 volt supply, depending on how much the voltage across the first battery 34 is less than the voltage across the second battery 46.

The voltage signal from the amplifier 110 is proportional to this voltage difference, the size of the signal having been predetermined to correspond to the rate of charging deemed appropriate for that difference in voltage. If the voltage drop across a diode 118a–118f is about 1.8 volts, the trigger means 122a–122f will operate to switch from the first rectifiers 78a–78f to the second rectifiers 80a–80f. More particularly, when the voltage at the output of the diode 118a–118f is above the system ground, current will flow through the base of the first transistor 126a–126f to ground. This will turn the transistor 130a–130f on, thereby causing current to flow from the emitter of the second transistor 130a–130f through its base to the emitter of the first transistor 126a–126f. The second transistor 130a–130f is thus turned on, thereby causing current to flow to the gate of the SCR 90a–90f, turning it on for the next alternating current cycle.

When the SCR 90a–90f is on, the first full wave bridge rectifier 78a–78f is back biased and turned off, so current only flows from the respective alternator means output through the second full wave rectifier 80a–80f to the 12 volt supply. When the 12 volt bus voltage returns to normal, the trigger means 122a–122f switches off, thereby leaving the SCR 90a–90f off during the next alternating current cycle, returning the first full wave rectifier 78a–78f to charging of the second battery 46.

Various other features of the invention are set forth in the following claims.

I claim:

1. In an electrical charging system of the type comprising an electrical current generating device having at least three output nodes, and first and second voltage buses each having a respective voltage, a control system comprising:
    at least three switching circuits, each interconnected to a respective one of the output nodes and the voltage buses, each switching circuit operative in a first mode to supply current from the respective output node to the first voltage bus, and in a second mode to supply current from the respective output node to the second voltage bus; and
    means, responsive to the voltage buses, for controlling the switching circuits to place, one, then two, then three of the switching circuits in the second mode as the voltage of the second bus progressively deviates from a target value to vary the rate at which the second bus is charged.

2. The invention of claim 1 wherein the charging system further comprises a first battery interconnected between the first and second voltage buses, and a second battery interconnected between the second voltage bus and a ground terminal.

3. The invention of claim 1 wherein each of said switching circuits comprises a first rectifier connected between the respective output node and the first bus, and a second rectifier connected between the respective output node and the second bus, said second rectifier being switchable between a nonconductive mode when the switching circuit is in the first mode and a conductive mode when the switching circuit is in the second mode.

4. The invention of claim 3 wherein each of the second rectifiers comprises a respective silicon controlled rectifier.

5. The invention of claim 1 wherein the controlling means comprises:
    means for setting the target value as a function of the difference between the voltages on the first and second buses.

6. The invention of claim 5 wherein the controlling means further comprises:
    means for generating a voltage signal having a magnitude indicative of the difference between the voltage of the second bus and the target value; and
    means, responsive to the voltage signal, for placing a variable number of the switching circuits in the second mode in accordance with the magnitude of the voltage signal.

7. The invention of claim 6 wherein the placing means comprises:
    means, serially connected to one another, for incrementally reducing the voltage signal to generate a plurality of trigger signals which are progressively reduced in magnitude with respect to the voltage signal; and
    means, responsive to the trigger signals, for placing individual ones of the switching circuits in the second mode in accordance with the magnitudes of corresponding ones of the trigger signals.

8. In an electrical charging system of the type comprising upper and lower voltage buses, a first battery connected between the buses, a second battery connected between the lower voltage bus and a ground terminal, and an electrical current generating device having at least three output nodes, a control system comprising:
    at least three switching circuits, each interconnected between a respective one of the output nodes and the buses, each switching circuit operative in a first mode to supply current from the respective output node to the upper voltage bus, and in a second mode to supply current from the respective output node to the lower voltage bus; and
    means, responsive to the voltage buses, for controlling the switching circuits to place one, then two, then three of the switching circuits in the second mode as the voltage of the lower voltage bus progressively falls below a desired value to vary the rate at which the second battery is charged.

9. The invention of claim 8 wherein each of said switching circuits comprises a first rectifier connected between the respective output node and the upper voltage bus and a second rectifier connected between the respective output node and the lower voltage bus, said second rectifier being switchable between a nonconductive mode when the switching circuit is in the first mode and conductive mode when the switching circuit is in the second mode.

10. The invention of claim 9 wherein each of the second rectifiers comprises a respective silicon controlled rectifier.

11. The invention of claim 8 wherein the controlling means comprises:
    first means for generating a voltage signal having a magnitude indicative of the difference between (1)

the voltage of the lower voltage bus and (2) the voltage difference between the buses; and second means, responsive to the voltage signal, for placing a variable number of the switching circuits in the second mode in accordance with the magnitude of the voltage signal.

12. The invention of claim 11 wherein the second means comprises:

means, serially connected to one another, for incrementally reducing the voltage signal to generate a plurality of trigger signals which are progressively reduced in magnitude with respect to the voltage signal; and means, responsive to the trigger signals, for placing individual ones of the switching circuits in the second mode in accordance with the magnitudes of corresponding ones of the trigger signals.

* * * * *

UNITED STATES PATENT AND TRADEMARK OFFICE
CERTIFICATE OF CORRECTION

PATENT NO. : 4,963,813
DATED : October 16, 1990
INVENTOR(S) : Donald Bolle It is certified that error appears in the above-identified patent and that said Letters Patent is hereby corrected as shown below:

On the title page, after "Mashino et al.......322/90 X" please insert --4,491,779 1/85 Campbell et al....320/17 X--.

In column 3, line 14, before "24-volt" please insert --a--.

In column 3, line 31, before "coil" please insert --field--.

In column 4, line 2, please delete "82a-80f" and substitute therefor --82a-82f--.

In column 4, line 58, before "resistor" please insert --a--.

Signed and Sealed this

Sixth Day of October, 1992

Attest:

DOUGLAS B. COMER

*Attesting Officer*   *Acting Commissioner of Patents and Trademarks*